(12) United States Patent
Robinson et al.

(10) Patent No.: US 6,464,155 B1
(45) Date of Patent: Oct. 15, 2002

(54) METHOD OF PROCESSING ANIMAL WASTE AND PARTS

(76) Inventors: Forrest L. Robinson, 12913 Woodson Dr., Overland Park, KS (US) 66209; Willis R. Campbell, 14129 Locust St., Olathe, KS (US) 66062

( * ) Notice: Subject to any disclaimer, the term of this patent is extended or adjusted under 35 U.S.C. 154(b) by 0 days.

(21) Appl. No.: 09/723,456

(22) Filed: Nov. 28, 2000

Related U.S. Application Data

(62) Division of application No. 09/338,147, filed on Jun. 23, 1999, now abandoned.
(60) Provisional application No. 60/090,494, filed on Jun. 24, 1998.

(51) Int. Cl.⁷ .............................................. B02C 19/06
(52) U.S. Cl. ...................................... 241/39; 241/79.1
(58) Field of Search .................................. 241/79.1, 39

(56) References Cited

U.S. PATENT DOCUMENTS

| | | | | |
|---|---|---|---|---|
| 4,984,748 | * | 1/1991 | Kimura | 241/100 |
| 5,236,132 | * | 8/1993 | Rowley, Jr. | 241/39 |
| 5,598,979 | * | 2/1997 | Rowley Jr. | 241/29 |

* cited by examiner

*Primary Examiner*—Allen Ostrager
*Assistant Examiner*—William Hong
(74) *Attorney, Agent, or Firm*—Miller Law Group. PLLC

(57) ABSTRACT

A process for the comminution and dehydration of animal waste and/or parts by feeding the animal waste and/or parts into a cyclonic, dehydrating comminuter facilitates the further processing of the comminuted and dehydrated animal waste discharged from the comminuter. Both the comminuted and dehydrated material and the air flow discharged from the cyclonic comminuter are sterilized to remove pathogens therefrom. The rate at which the animal waste and/or parts material is fed into the cyclonic comminuter. is directly related to the moisture content of the comminuted and dehydrated material discharged from the material discharge opening of the comminuter. Preferably, the moisture content of the discharged material is in the range of 25% to 35% to facilitate the pelletizing of the discharged material after being sterilized. Other precesses, however, can require the drying of the discharged material to about 10%. An air flow control mechanism is provided for the cyclonic comminuter to enhance the ability to control the discharge of air from the comminuter. The control is provided with adjustable vanes actuated from a actuator projecting outwardly from the comminuter to permit an easy adaptation to automated controls to restrict the size of the air discharge opening from the comminuter.

19 Claims, 4 Drawing Sheets

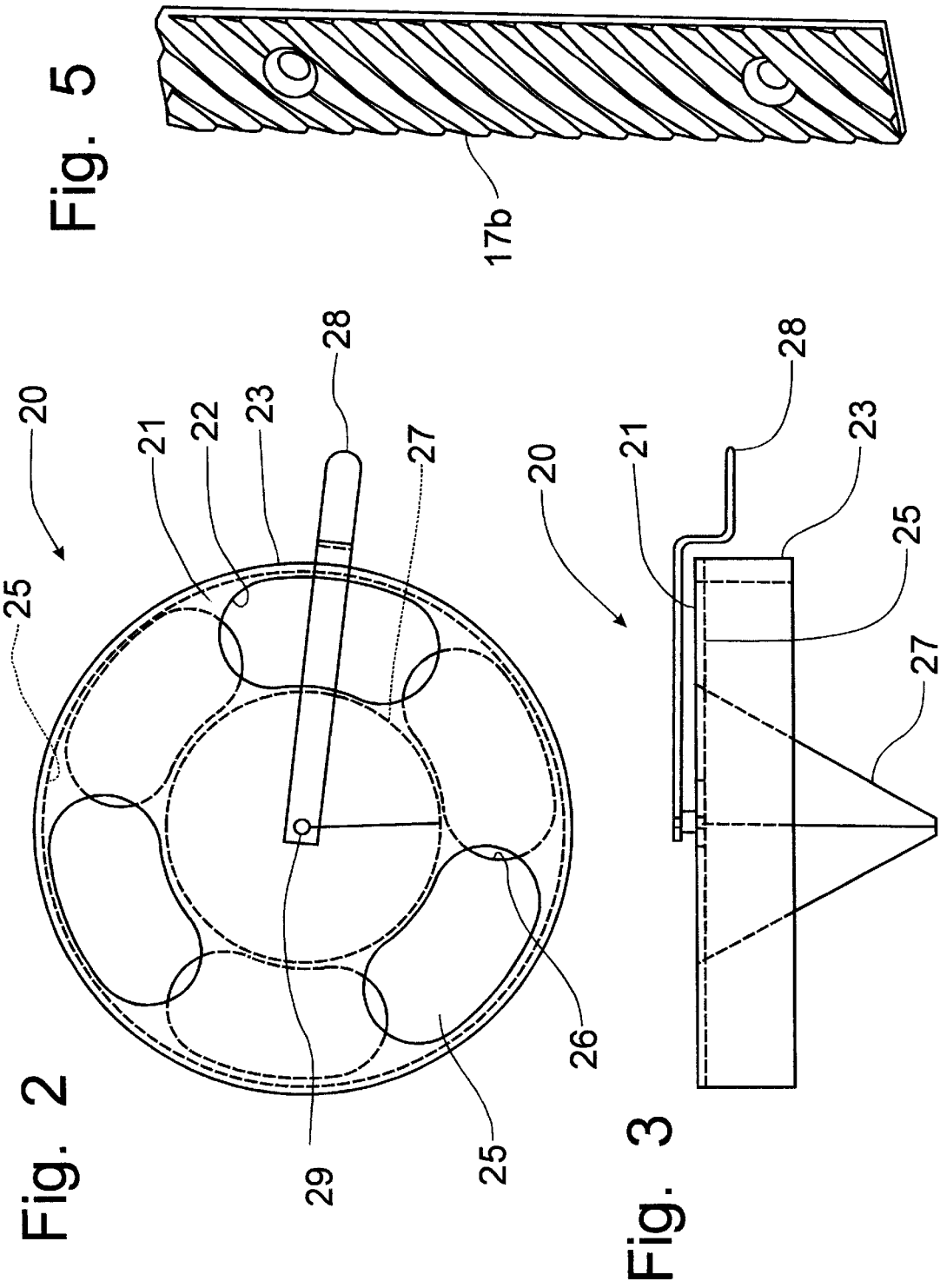

METHOD OF PROCESSING ANIMAL WASTE AND PARTS

CROSS-REFERENCE TO RELATED APPLICATIONS

This application is a division of U.S. patent application Ser. No. 09/338,147, filed Jun. 23, 1999 abandoned, and claims domestic priority on U. S. Provisional Patent Application Ser. No. 60/090,494, filed on Jun. 24, 1998.

BACKGROUND OF THE INVENTION

This invention relates generally to the comminution and dehydration of animal wastes and waste animal parts utilizing a cyclonic comminuter and, more particularly, to the process of treating animal waste products, including manure, as a pre-treatment conditioner for further appropriate treatment of the output material.

An environmentally acceptable treatment of animal waste, including animal manure and waste animal parts, has become an important issue. Feed lots, whether used for the production of hogs, cattle, chickens or the like, create a concentrated collection of manure at one geographic area. The disposal of dead animals and waste animal parts from slaughter operations presents a similar environmental problem. One solution is the processing of animal waste material for sale as animal feed or as compost. Such processes are known, but have not yet been proven to be commercially feasible.

Accordingly, a process, method and apparatus for pre-treating animal waste products to create an output that is acceptable for further processing treatment in a cost effective way would be highly desirable. Such a process must also be effective in the removal of pathogens from the waste product being treated.

SUMMARY OF THE INVENTION

It is an object of this invention to provide a method of processing animal waste to effect a comminution and a dehydration thereof by feeding said animal waste into a cyclonic comminuter.

It is another object of this invention to provide a method of processing animal waste including the steps of feeding the animal waste into the air flow of a cyclonic dehumidifying comminuter to comminute said animal waste and to effect dehydration thereof, the comminuted and dehydrated animal waste being discharged through a material discharge opening at a bottom portion of the cyclonic comminuter while moisture laden air flow is discharged through an air discharge opening;

sterilizing the discharged air flow after being exhausted from said comminuter to remove pathogens therefrom before being released to the atmosphere; and passing the comminuted and dehydrated animal waste through a sterilization chamber after being discharged from the cyclonic comminuter to destroy pathogens therein.

It is a feature of this invention that the flow rate of the animal waste through the cyclonic comminuter can be controlled to establish a desired moisture content of the comminuted and dehydrated animal waste being discharged from the cyclonic comminuter.

It is an advantage of this invention that the comminuted and dehydrated animal waste being discharged from the cyclonic comminuter can be further processed by pelletizing for shipment thereof to a remote location.

It is another feature of this invention that an auger can be used for metering the flow of animal waste into the infeed of the cyclonic comminuter.

It is another advantage of this invention that the auger used for metering the flow of animal waste into the infeed of the cyclonic comminuter will mix different supplies of animal wastes containing different moisture levels for feeding into the cyclonic comminuter.

It is still another feature of this invention that the comminuted and dehydrated animal waste and the moisture laden air flow discharged from the cyclonic comminuter are sterilized to remove pathogens therefrom.

It is yet another feature of this invention that the animal waste can be manure or animal parts.

It is still another object of this invention to provide an air flow control mechanism to control the discharge of air from the cyclonic comminuter.

It is yet another feature of this invention that the air flow control mechanism has an adjustable damper control that restricts the size of the discharge opening for the air flow from the cyclonic comminuter.

It is yet another advantage of this invention that the adjustable damper control is easily adaptable to automated control mechanisms.

These and other objects, features, and advantages are accomplished according to the instant invention by providing a process for the comminution and dehydration of animal waste and/or parts by feeding the animal waste and/or parts into a cyclonic, dehydrating comminuter to facilitate the further processing of the comminuted and dehydrated animal waste discharged from the comminuter. Both the material and the air flow discharged from the cyclonic comminuter are sterilized to remove pathogens therefrom. The rate at which the animal waste and/or parts material is fed into the cyclonic comminuter is directly related to the moisture content of the comminuted and dehydrated material discharged from the material discharge opening of the comminuter. Preferably, the moisture content of the discharged material is in the range of 25% to 35% to facilitate the pelletizing of the discharged material after being sterilized. Other precesses, however, can require the drying of the discharged material to about 10%. An air flow control mechanism is provided for the cyclonic comminuter to enhance the ability to control the discharge of air from the comminuter. The control is provided with adjustable vanes actuated from a actuator projecting outwardly from the comminuter to permit an easy adaptation to automated controls. to restrict the size of the air discharge opening from the comminuter.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a schematic top plan view of the damper mechanism controlling the flow of air being discharged from the sleeve;

FIG. 3 is a schematic side elevational view of the damper shown in FIG. 2;

FIG. 5 is a perspective view of a rasp bar to depict the configuration of each of the plurality of rasp bars lining the interior of the periphery of the cylindrical portion of the housing;

DETAILED DESCRIPTION OF THE PREFERRED EMBODIMENT

Figure 4:
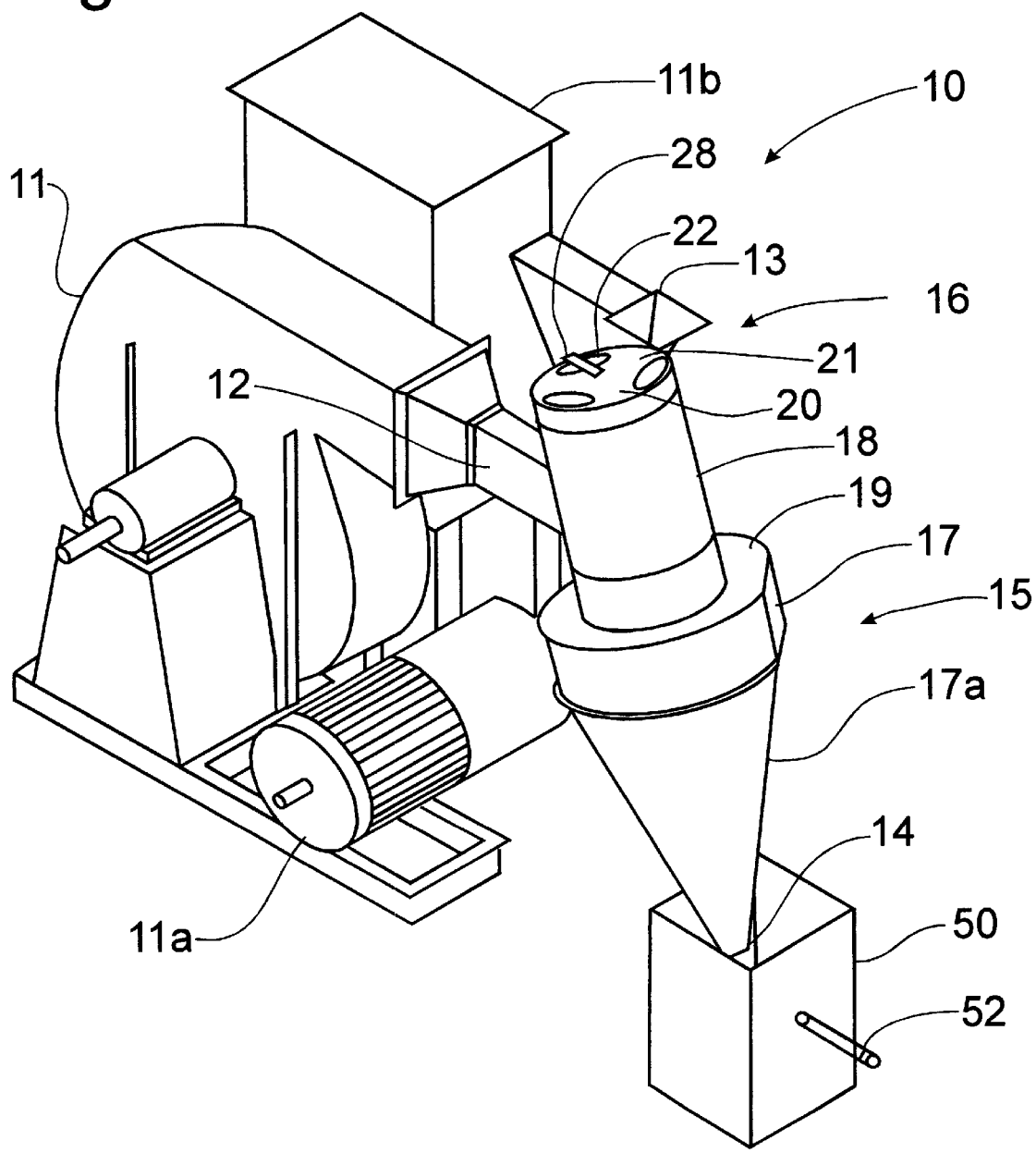
FIG. 4 is a perspective view of the comminuting/dehydrating machine shown in FIG. 1, but with a sterilizing apparatus positioned to receive material discharged from the conical housing.
Figure 6:
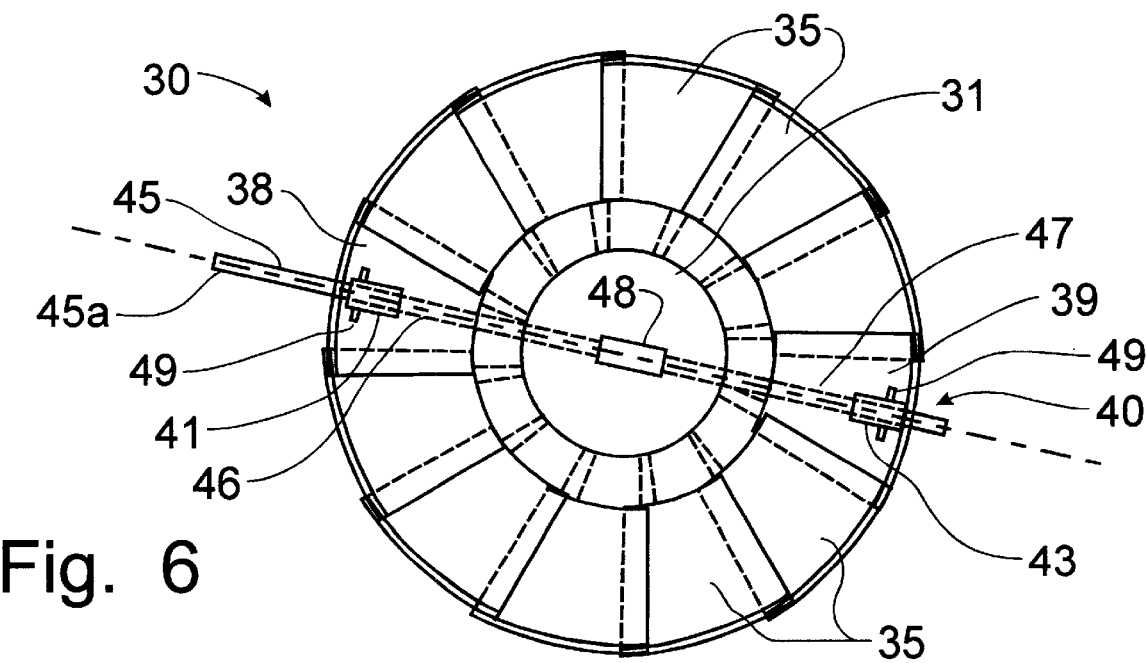
FIG. 6 is a schematic cross-sectional view of the upper portion of the air discharge sleeve to depict an alternative air flow control mechanism, one of the vanes being schematically depicted in the center of the sleeve, the remaining vanes have not been shown for purposes of clarity.
Figure 7:
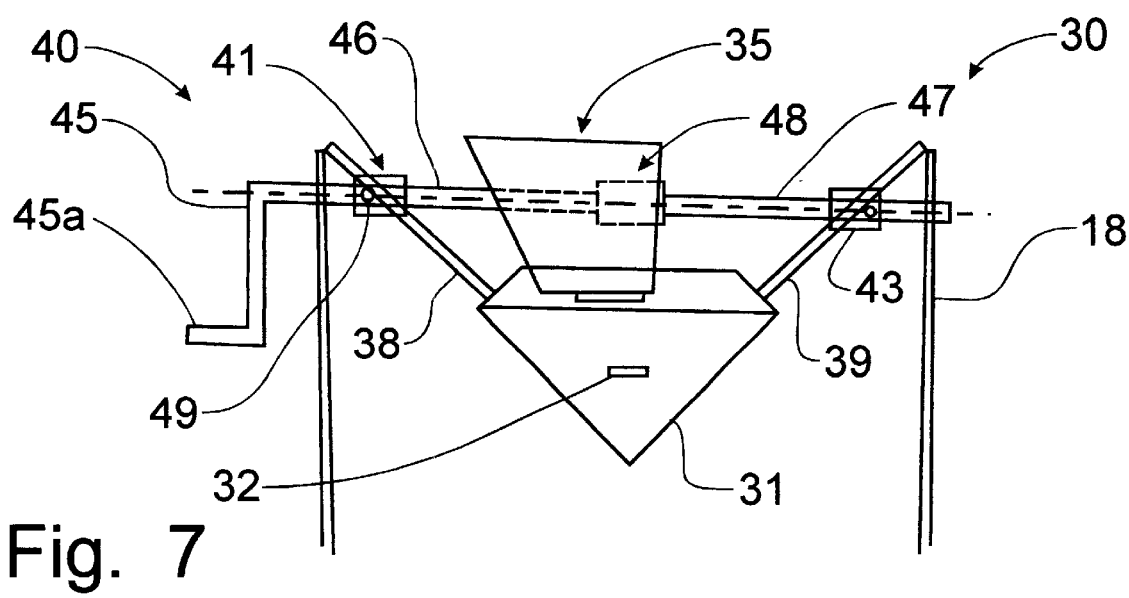
FIG. 7 is a top plan view of the air discharge sleeve with the air flow control mechanism in a fully closed position.
Figure 8:
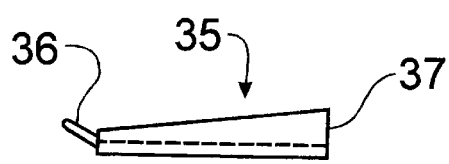
FIG. 8 is a side elevational view of one of the adjustable vanes.

Comminuting dense material through a cyclonic comminuting/dehydrating machine, such as shown in U.S. Pat. No. 3,794,25 1, issued on Feb. 26, 1974, for a "Material Reducing System and Apparatus", is well known in the art. A cyclonic comminuting/dehydrating machine similar to that disclosed in U.S. Pat. No. 5,236,132, is schematically depicted in the perspective views of FIGS. 1 and 4. The descriptive portions of the aforementioned U.S. Pat. No. 3,794,251 and U.S. Pat. No. 5,236,132 are incorporated herein by reference, particularly with respect to the manner and mechanism through which a cyclonic comminuting/ dehydrating machine operates.

Such a cyclonic comminuting/dehydrating machine 10 operates to create a high velocity stream of air from a fan 11 that is directed through a conduit 12 into an inverted conical housing 15. The stream of air is directed into a tornado-like swirling motion within the housing before being discharged out the exit opening 16 at the top center portion of the housing 15. A damper 20 controls the flow of air through the air exit opening 16 and the depth of the swirling motion of the air within the housing 15. Preferably, the fan 11 is driven by a power source, such as an electric motor 11a that is drivingly connected with the fan 11 via conventional drive transfer devices (not shown), such as belts and pulleys. Because of the noise generated by the operation of the large fan 11, a silencer 11b is used to dampen the noise.

A cylindrical sleeve 18, co-operable with the damper 20, is axially movable within the housing 15 to also control the depth of cyclonic comminution of material within the housing 15. A pair of linear actuators (not shown), which can be powered hydraulically, pneumatically or electrically, can interconnect the sleeve 18 and the sleeve support 19 forming the top wall of the cylindrical portion 17 of the housing 15 to power the movement of the sleeve 18 within the housing 15. The positioning of the sleeve 18 deep into the housing 15 provides for greater comminution of the material fed through the conduit 12, while a shallow penetration of the sleeve 18 into the housing allows for a more rapid exit of the swirling air from the housing 15 through the air exit opening 16 and, therefore, provides only minimal comminution of the material.

A discharged air recovery mechanism (not shown) can be provided to capture the discharged stream of air from the air exit opening 16 to prevent the discharge of any fractional components within the discharged air into the atmosphere to control pollution and allow the recovery of any fractional component therein, as will be discussed in greater detail below. A material infeed hopper 13 meters the flow of material into the air stream in the conduit 12 so that the material to be comminuted enters the housing 15 generally tangentially with the stream of air from the conduit 12. Preferably, the infeed hopper 13 includes an air lock 13a having a rotational member that limits the escape of air from the conduit 12 while feeding material into the conduit 12 for flow into the housing 15.

The housing 15 includes a cylindrical portion 17 that receives the air stream, and material flowing therein, from the conduit 12 and directs the air stream into a swirling motion within the housing 15. Depending immediately below the cylindrical portion 17 is a conical portion 17a that directs the swirling air flow into decreasing-radius turns until the air can escape up through the sleeve 18, past the damper 20 and into the discharged air recovery mechanism (not shown). The conical portion 17a terminates in a material discharge opening 14 at its lowermost extremity for the discharge of comminuted material from the housing 15.

The cylindrical portion 17 is lined with steel rasp bars 17b (FIG. 5), which may be hardened, and when coupled with the differential forces associated with the tornado-like swirling motion of the air stream within the housing 15, serve to comminute material fed therein through implosion, impaction and centrifugal force, on the basis of quantity and density of the material fed therein. At least the upper areas of the conical portion 17a preferably also have spirally arranged members (not shown) that assist in the comminution of material within the housing 15 and deflect material upwardly toward the cylindrical portion 17 to further the comminuting process.

As best seen in FIGS. 1–4, the damper 20 is mounted on top of the cylindrical sleeve 18 to control the flow of air discharged therethrough. The damper 20 is formed of a generally flat top plate 21 welded to a cylindrical skirt 23 to form a cap on the end of the sleeve 18. A second flat plate 25 is rotatably supported beneath the top plate 21, such as by a pivot bolt 29. Both the top plate and the second plate are formed with openings 22, 26, respectively, arranged adjacent the outer periphery of the plates 21, 25. These openings 22, 26 are alignable upon rotation of the second plate 25 relative to the top plate 21 to define a variable sized discharge openings through the damper 20. The relative rotated position of the second plate 25. with respect to the top plate 21 defines the size of the discharge openings extending through the damper 20 for the discharge of air therethrough. When the openings 22, 26 are completely aligned, the maximum sized discharge opening through the damper 20 is obtained.

A fixed cone 27 is positioned below the second plate 25 to direct outwardly the flow of swirling air moving upwardly through the sleeve 18, so that the air flow is directed smoothly toward the at least partially aligned openings 22, 26. The fixed cone 27 is not adjustable, except that it is preferably affixed to the underside of the second plate 25 to be rotatable therewith. An actuation handle 28 is affixed to the second plate 25, preferably through the pivot bolt 29, and extends outwardly beyond the boundaries of the sleeve 18 to permit the rotation. of the second plate 25 to adjust the size of the openings extending through the damper 20.

One skilled in the art will readily recognize that a powered mechanism (not shown) could be operatively associated with the handle 28 to permit the remote control of the rotation of the second plate 25 relative to the top plate 21. Such a powered mechanism (not shown) could include a hydraulic, pneumatic or electric linear actuator, such as an extensible cylinder, or screw threads interconnecting the handle and either a frame reference or the skirt 23 or sleeve 18. Alternatively, a gear, electric or hydraulic motor could also be used to rotate the valve around its center pivot shaft.

Figure 9:
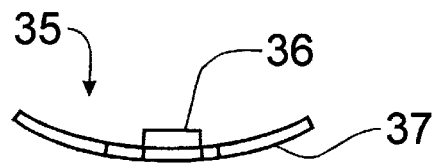
FIG. 9 is a end view of one of the adjustable vanes.

Referring now to FIGS. 6–9, an alternative (and preferred) embodiment. of the air flow control mechanism 30 can best be seen. The air flow control mechanism 30 includes a fixed cone 31 supported in the center of the air discharge sleeve 18 by a fixed support 32 to force the flow of air being discharged up the sleeve 18 into a circular pattern toward the outside of the sleeve 18. The cone 31 pivotally supports a plurality of vanes 35 arranged in an overlapping configuration. Each vane 35 includes a pivot support arm 36 that engages the cone 31 and permits movement in a manner described in greater detail below. The pivot support arm 36 may require an additional bend to retain the engagement thereof with the cone 31 during movement. The body portion 37 of each vane 35 is curved, as best seen in FIG. 9, and is oriented on top of the adjacent vane 35 on one side and beneath the adjacent vane 35 on the opposing side to effect simultaneous movement of the vanes 35 as described below.

The air flow control assembly 30 includes an actuator mechanism 40 connected to a first actuator vane 38 on one side of the sleeve 18 and to a second actuator vane 39 on the opposing side of the sleeve 18. The first actuator vane 38 is attached to a first actuator nut 41 having left hand threads, while the second actuator vane 39 is attached to a second actuator nut 43 having right hand threads. A crank arm assembly 45, formed of two rods 46, 47 interconnected by a connector coupling 48, is rotatably supported on the sleeve 18 and threadably mounts the two actuator nuts 41, 43 so that upon rotation of the crank arm assembly 45 the two nuts 41, 43 are translated along the length of the rod 46, 47 on which they are mounted toward or away from each other, depending on the direction of rotation of the crank arm assembly 45.

To force the actuator nuts 41, 43 to translate along the corresponding rods 46, 47 upon rotation of the crank arm assembly 45 and to effect movement of the vanes 35, the actuator nuts 41, 43 are connected to the corresponding actuator vane 38, 39 by a pin 49 mounted through a pair of mounting ears (not shown). The mounting ears (not shown) could be formed on either the actuator nut 41, 43 or on each of the respective actuator vanes 38, 39. The ears (not shown) are formed with slots (not shown) so that the pins 49 can slide within the corresponding slot (not shown) as the actuator nuts 41, 43 effect pivotal movement of the actuator vanes 38, 39.

In operation, the size of the discharge opening through the sleeve 18 is controlled by the rotation of the crank arm assembly 45. By rotating the crank handle 45a in a clockwise direction, the left hand thread actuator nut 41 and the right hand thread actuator nut 43, each of which are connected to the corresponding actuator vane 38, 39 as described above, move along the rod 46, 47 toward each other. This motion pulls the corresponding actuator vanes 38, 39 along with the actuator nuts 41, 43, causing the actuator vanes 38, 39 to pivotally move about their respective connection with the fixed cone 31 in a generally vertical direction, creating a gap between the vanes 38, 39 and the circumference of the sleeve 18. Since all of the other vanes 35 are overlapped with each other and with the actuator vanes 38, 39, the generally vertical movement of the actuator vanes 38, 39 is transferred to the other vanes 35, creating an annular ring opening between the vanes 35, 38 and 39 and the circumference of the sleeve 18.

An opposite rotation of the crank handle 45a will cause a movement of the actuator nuts 41, 43 away from each other. This motion has the opposite effect to that described above, causing the actuator vanes to pivotally move downwardly toward the outer circumference of the sleeve 18. Again, since the vanes 35, 38 and 39 are arranged in an overlapping configuration, all of the vanes 35, 38 and 39 move downwardly together, narrowing the annular gap between the vanes and the sleeve 18 through which the air is discharged.

As with the damper mechanism 20, a powered mechanism (not shown) could be operatively associated with the crank handle assembly 45 to permit the remote control of the rotation thereof to move the vanes 35 up and down and vary the effective size of the air discharge opening. Such a powered mechanism (not shown) could include a hydraulic, pneumatic or electric motor that can effect an appropriate rotation of the crank arm assembly 45, although the crank handle 45a would likely need to be removed.

The operation of the actuators (not shown) controlling the depth of penetration of the sleeve 18 within the housing 15 in conjunction with the operation of the actuator controlling the rotation of the second plate 25, which can be accomplished either together or separately, controls the flow of air through the comminuting/dehydrating machine 10 and, therefore, extent of both the comminution of the material fed into the housing 15 and the dehydration thereof. The size of the discharge openings through the damper 20, which is defined by the extent of alignment of the openings 22, 26, can be set to a specific percentage of the maximum size discharge opening to provide the amount of air flow desired or the rotated position of the second plate 25 can be programmed to correspond to a specific material being fed into the housing 15 for comminution and dehydration.

The comminuter/dehydrating machine 10 partially works on the density of the material being fed into the air flow through the conduit 12 into the housing 15, the velocity of the flow of air through the conduit 12 into the housing 15, and the amount of vacuum found at the discharge opening 14 of the conical portion 17a. All of these factors work together to hold the material in the housing long enough to get the desired results, expressed in terms of the fineness of comminution and the moisture content of the material.

Other factors in the operation of the machine 10 include the toughness, hardness, and size, and in some cases, the fibrous content of the material being treated. The control of all of these factors can be achieved by controlling two variables, controlling the flow of air and controlling the time the material is being processed in the housing 15. The control of the depth of sleeve 18 into the housing 15 and the air flow through the sleeve 18 controls these two variables.

Surprisingly, a cyclonic, dehumidifying comminuting machine 10 has been found to be operable to disintegrate considerably less dense material such as manure. By controlling the level of comminution within the housing 15 through manipulating the depth of the sleeve 18 into the housing 15 and the operation of the damper 20, the amount of comminution of the manure can be selectively controlled. This control not only permits the extent of comminution of the manure material being fed into the housing 15, but also the extent of dehydration of the manure material. Moisture content of the treated product discharged from the comminuter 10 is an important factor in the further treatment thereof by further appropriate apparatus.

Figure 1:
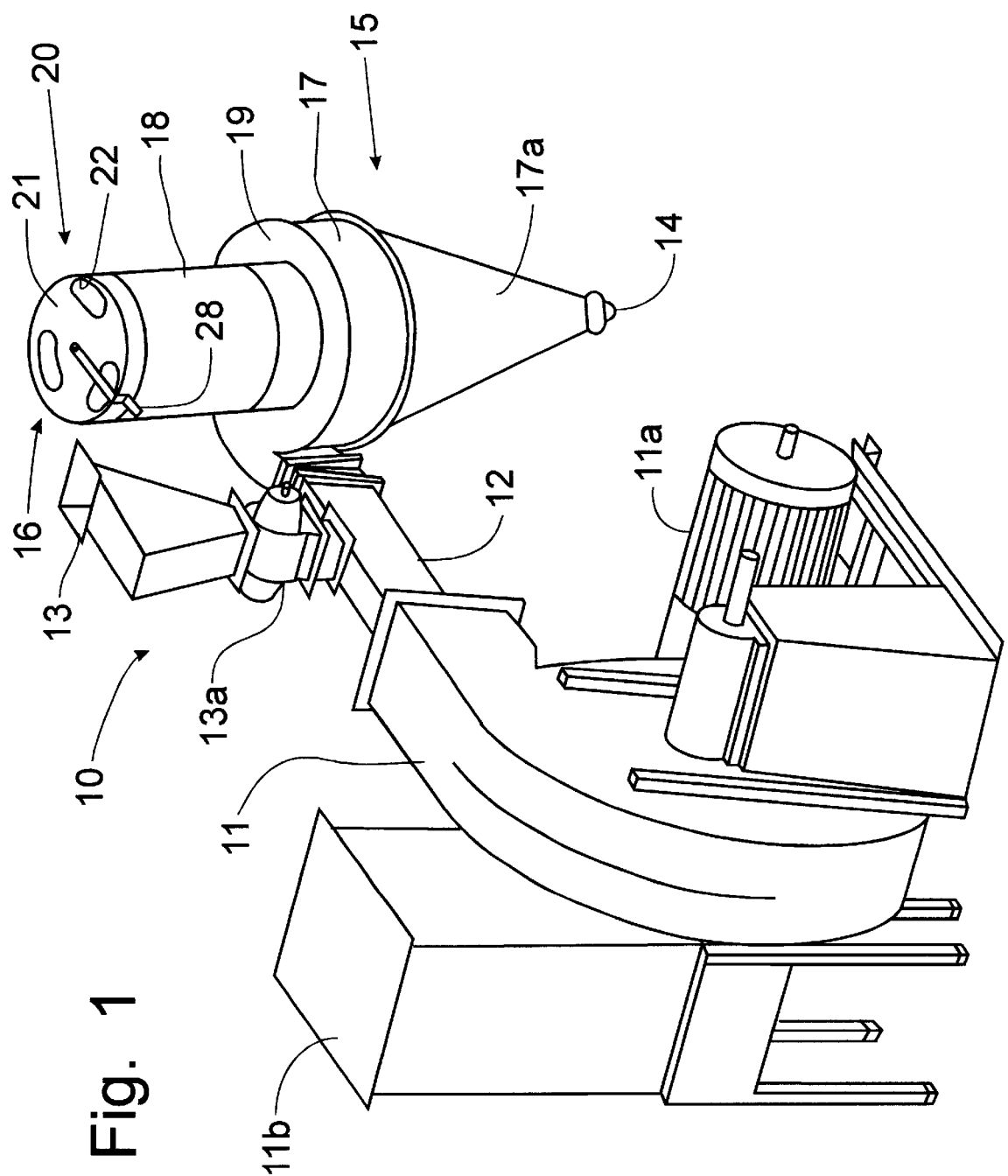
FIG. 1 is a perspective view of a comminuting/dehydrating machine incorporating the principles of the instant ivention.

Referring first to FIG. 1, the apparatus for treating manure and animal waste parts can best be seen. Animal manure is generally found in two types, with bedding material, such as straw, wood shavings, sawdust or other organic material, and without bedding material. Manure with bedding material generally has a lower moisture level per given volume of material. This is particularly true with respect to chicken manure. Using chicken manure as an example, the type without bedding is usually the by-product of layer barns where the chickens are retained for the purpose of laying eggs only.

The comminuter/dehydration machine 10 can be positioned to receive the animal manure from a collection facility (not shown) via a conveyor mechanism (not shown), preferably an auger apparatus. The use of an auger conveyor provides the benefits of serving as a metering device to the material infeed hopper 13 and of preferably mixing the manure of the first type with the manure of the second type to provide a relatively uniform material, at least in terms of moisture content, for processing in the machine 10. This, in turn, allows the operation of the machine to be more consistent to provide a generally uniform moisture content for the material discharged from the machine 10.

One possible further treatment of the material discharged from the machine 10 is to pelletize the discharged material for shipment to a remote location. A pelletizer works most efficiently at about a 25%–35% (optimally approximately 30%) moisture content. Providing a discharged material that has a substantially lower moisture content requires the pelletizer to add moisture, usually via the application of steam to the material. Infeeding only high moisture, non-bedding manure to the machine 10 requires a longer retention time of the material within the housing 15, and thereby reducing throughput. Another possible further treatment that will be recognized by one skilled in the art includes the removal of moisture down to about 10% or below to permit proper storage without pelletizing. This process would permit blending without other fertilizers for a rapid release of the fertilizing materials to the plants.

The machine 10 works at ambient temperatures, except for the increase in operating temperature relating to friction from the fan and the changes in direction from impact with the internal rasp bars 17b mounted on the interior periphery of the cylindrical portion 17 of the housing 15. The moisture in the material being fed into the housing 15 through the conduit 12 is atomized as the material is being comminuted within the housing 15. The tremendous volume of air flow generated by the fan 11 carries this atomized moisture into the sleeve 18 to be discharged from the machine 10, thereby dehydrating the material being comminuted. The rate at which the material is fed into the housing 15 is a factor that determines the dryness of the discharged material, as well as the volume of the material being discharged. If a lower moisture content is desired in the discharged material, the feed rate of material fed into the housing 15 must be slowed.

The description given above with respect to chicken manure also applies to waste animal parts. The material being fed into the housing 15 will be reduced in size and various components will be separated by particle size and density. All of the material fed into the housing will exit the material discharge opening 14 at the bottom of the conical portion 17a, except for the material that is atomized and entrained within the air flow being discharged from the housing 15 through the sleeve 18.

It has been found that most of the pathogens found in the manure and waste animal parts fed into the housing 15 are discharged with the air flow through the sleeve 18, requiring that the discharged air be captured by a collector system for further treatment before being discharged into the atmosphere. Surprisingly, tests have shown that in comminuted and dehydrated chicken manure, discharged through the material discharge opening 14 at a moisture content between 25%–30%, the content of pathogens is very low. However, if such material is going to be pelletized for shipment to a remote location, or subjected to other additional processing steps, no pathogens are permitted in this discharged material.

Accordingly, the comminuted and dehydrated material being discharged through the opening 14 is collected in a sterilization container 50 that is cooperatively associated with a conveyor system (not shown) for the purpose of conveying the discharged material away from the machine 10. Such a conveyor can be of any known type, such as a belt or chain conveyor, an auger or an air delivery system. Prior to being conveyed from the sterilization container 50, the discharged material is subjected to a sterilization procedure represented by the microwave electron tube 52 or an electric discharge mechanism (not shown) that charges a conductor grid. Such an electric discharge mechanism (not shown) creates an electrical arc between grid points which heats the discharged material to a sufficiently high temperature to kill all of the remaining pathogens.

One skilled in the art will readily recognize that other methods of sterilizing the discharged material can also be used, including the use of a plasma arc, ultra-violet light, steam heating. The sterilization should preferably occur immediately after the material is discharged from the opening 14 into the sterilization container 50 as no additional step would be necessary in the further processing of the discharged material, such as pelletizing.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of processing animal waste, comprising the steps of:

feeding said animal waste into an air flow of a cyclonic dehumidifying comminuter;

comminuting and dehydrating said animal waste in said cyclonic comminuter to create comminuted and dehydrated animal waste and moisture laden air;

discharging said comminuted and dehydrated animal waste through a material discharge opening at a bottom portion of said cyclonic comminuter;

discharging the flow of said moisture laden air through an air discharge opening;

sterilizing said discharged air flow after being exhausted from said comminuter to remove pathogens therefrom before being released to the atmosphere;

passing said comminuted and dehydrated animal waste through a sterilization chamber after being discharged from said cyclonic comminuter to destroy pathogens therein; and further processing said sterilized animal waste for shipment to a remote location.

2. The method of claim 1 wherein said step of further processing said sterilized animal waste includes the step of:
  pelletizing said sterilized animal waste.

3. The method of claim 2 wherein said feeding step includes the step of:
  metering the flow of said animal waste into said cyclonic comminuter as a function of the moisture level of said comminuted and dehydrated animal waste being discharged from said material discharge opening.

4. The method of claim 3 wherein said metering step produces a moisture content of said comminuted and dehydrated animal waste being discharged from said material discharge opening in the range of 25% to 35%.

5. The method of claim 4 wherein said metering step includes the step of:
  using an auger to convey said animal waste to an infeed opening in said cyclonic comminuter.

6. The method of claim 5 wherein said auger mixes animal wastes containing different levels of moisture before metering the mixed animal waste into said infeed opening.

7. A method of processing animal waste, comprising the steps of:
  feeding said animal waste into an air flow of a cyclonic dehumidifying comminuter;
  comminuting and dehydrating said animal waste to create comminuted and dehydrated animal waste and moisture laden air;
  discharging said comminuted and dehydrated animal waste at a moisture content through a material discharge opening at a bottom portion of said cyclonic comminuter;
  discharging said moisture laden air flow through an air discharge opening;
  controlling the rate at which said animal waste is fed into said cyclonic comminuter as a function of the actual moisture content of said comminuted and dehydrated animal waste discharged through said material discharge opening compared to a desired moisture content;
  monitoring the actual moisture content of said comminuted and dehydrated animal waste discharged through said material discharge opening;
  sterilizing said discharged air flow after being exhausted from said comminuter to remove pathogens therefrom before being released to the atmosphere;
  passing said comminuted and dehydrated animal waste through a sterilization chamber after being discharged from said cyclonic comminuter to destroy pathogens therein; and
  further processing said sterilized animal waste for shipment to a remote location.

8. The method of claim 7 wherein said feeding step is controlled to produce a moisture content of said comminuted and dehydrated animal waste being discharged from said material discharge at approximately 10%.

9. The method of claim 8 wherein said step of further processing said sterilized animal waste includes the step of:
  blending said sterilized animal waste with other fertilizer materials before being spread on the ground as a fertilizing material.

10. The method of claim 7 wherein said feeding step is controlled to produce a moisture content of said comminuted and dehydrated animal waste being discharged from said material discharge opening in the range of 25% to 35%.

11. The method of claim 10 wherein said feeding step includes the step of:
  conveying said animal waste into an infeed opening in said cyclonic comminuter by an auger that will meter the flow of said animal waste at a desired flow rate.

12. The method of claim 11 wherein said auger mixes animal wastes from at least two different supply sources containing different levels of moisture before metering the mixed animal waste into said infeed opening.

13. A method of processing animal waste, comprising the steps of:
  feeding said animal waste into an air flow of a cyclonic dehumidifying comminuter;
  dehydrating said animal waste and parts to create dehydrated animal waste and moisture laden air;
  discharging said dehydrated animal waste at a moisture content through a material discharge opening at a bottom portion of said cyclonic comminuter;
  discharging the flow of said moisture laden air through an air discharge opening;
  monitoring the actual moisture content of said dehydrated animal waste discharged through said material discharge opening; and
  controlling the rate at which said animal waste are fed into said cyclonic comminuter as a function of the actual moisture content of said dehydrated animal waste discharged through said material discharge opening compared to a desired moisture content.

14. The method of claim 13 wherein said feeding step is controlled to produce a moisture content of said dehydrated animal waste being discharged from said material discharge at approximately 10%.

15. The method of claim 13 further comprising the steps of:
  sterilizing said discharged air flow after being exhausted from said comminuter to remove pathogens therefrom before being released to the atmosphere;
  passing said dehydrated animal waste through a sterilization chamber after being discharged from said cyclonic comminuter to destroy pathogens therein; and
  further processing said sterilized animal waste for shipment to a remote location.

16. The method of claim 15 wherein said step of further processing said sterilized animal waste includes the steps of:
  pelletizing said sterilized animal waste; and
  blending said pelletized and sterilized animal waste with other fertilizer materials before being spread on the ground as a fertilizing material 17. The method of claim 13 wherein said controlling step changes the rate at which said animal waste is fed into said cyclonic comminuter to produce a moisture content of said comminuted and dehydrated animal waste being discharged from said material discharge opening in the range of 25% to 35%.

18. The method of claim 17 wherein said feeding step includes the step of:
  conveying said animal waste into an infeed opening in said cyclonic comminuter by an auger that will meter the flow of said animal waste at a desired flow rate.

19. The method of claim 18 wherein said auger mixes animal wastes from at least two different supply sources containing different levels of moisture before metering the mixed animal waste into said infeed opening.

* * * * *